United States Patent [19]

Batty et al.

[11] Patent Number: 5,834,545
[45] Date of Patent: Nov. 10, 1998

[54] SOLID POLYMERIC PRODUCTS AND THEIR USE

[75] Inventors: Norman Stewart Batty; Martin William Whitley, both of West Yorkshire; Adrian Swinburn Allen, North Yorkshire, all of United Kingdom

[73] Assignee: Allied Colloids Limited, West Yorkshire, United Kingdom

[21] Appl. No.: 532,761

[22] PCT Filed: Feb. 10, 1995

[86] PCT No.: PCT/GB95/00283

§ 371 Date: Oct. 11, 1995

§ 102(e) Date: Oct. 11, 1995

[87] PCT Pub. No.: WO95/21797

PCT Pub. Date: Aug. 17, 1995

[30] Foreign Application Priority Data

Feb. 11, 1994 [GB] United Kingdom .................. 9402717

[51] Int. Cl.[6] ............................. C08L 33/00; C08L 91/00
[52] U.S. Cl. ........................ 524/276; 524/275; 524/277; 524/279; 523/207
[58] Field of Search .................... 524/275, 277, 524/276, 279; 523/207

[56] References Cited

U.S. PATENT DOCUMENTS

| | | | |
|---|---|---|---|
| 3,305,019 | 2/1967 | Katzer | 166/310 |
| 3,435,618 | 4/1969 | Katzer | 524/279 |
| 3,839,500 | 10/1974 | Dexter | 524/377 |
| 3,891,592 | 6/1975 | Chauvel et al. | 524/762 |
| 3,975,341 | 8/1976 | Trapasso | 524/801 |
| 4,017,431 | 4/1977 | Aldrich | 524/276 |
| 4,389,506 | 6/1983 | Hassall, Jr. | 528/494 |
| 4,396,731 | 8/1983 | Dawans et al. | 524/275 |
| 4,797,275 | 1/1989 | Brooks et al. | 514/274 |
| 5,066,711 | 11/1991 | Colon et al. | 524/275 |
| 5,126,390 | 6/1992 | Duff | 524/275 |
| 5,346,986 | 9/1994 | Schneider et al. | 528/495 |

FOREIGN PATENT DOCUMENTS

| | | |
|---|---|---|
| 0190002 | 8/1986 | European Pat. Off. . |
| 2616639 | 10/1976 | Germany . |
| 57-643 | 3/1982 | Japan . |
| 57-162610 | 10/1982 | Japan . |
| 9213912 | 8/1992 | WIPO . |

*Primary Examiner*—Vasu Jagannathan
*Assistant Examiner*—Olga Asinovsky
*Attorney, Agent, or Firm*—Sughrue, Mion, Zinn, Macpeak & Seas, PLLC

[57] ABSTRACT

Reverse phase polymer particles having a size below 10 μm are provided as a solid product comprising a solid dispersion of the particles in a wax matrix which is solid at 20° C. and which melts below 250° C. The product may be made by dissolving the wax into the organic liquid phase of the product of a reverse phase emulsion polymerisation process followed by distillation of the organic liquid and cooling of the resultant product. The product is generally in particulate form and can be used as a flocculant or viscosifier, especially as a textile print paste thickener.

12 Claims, No Drawings

SOLID POLYMERIC PRODUCTS AND THEIR USE

This invention relates to products which comprise water soluble or water swellable polymeric particles.

It is standard practice to produce such particulate polymeric material as relatively coarse particles, for instance having a size above 100 µm, by techniques such as reverse phase bead polymerisation followed by drying and recovery of the polymer beads, and by gel polymerisation followed by drying and comminution. These processes can result in the production of some finer particles, known as fines and typically having sizes down to, for instance, 30 or 50 µm. It is known to treat either the entire product or the fines so as to reduce dusting problems, and it is known to treat the particulate product so as to facilitate dissolution of the powder when it is mixed with water.

For instance in U.S. Pat. No. 3,839,500 polyacrylamide powder is coated with 0.1 to 20%, usually 0.1 to 10%, polyalkylene glycol which is usually applied as a solution. The process is said to cause some agglomeration. It is also stated that granulated polyalkylene glycol can be blended in a rotating drum with the polymer particles while heated to a temperature which is sufficient to melt the polyalkylene glycol and the blended product may then be cooled while mixing before being discharged from the rotating drum.

In U.S. Pat. No. 4,389,506, the dustiness of polyvinyl alcohol powder is reduced, and agglomeration is said to occur, by blending with 0.5 to 4% polyethylene glycol at a temperature at which the polyethylene glycol is liquid other methods involving the use of polyethylene glycol for reducing dustiness or improving water dispersibility of materials or as agglomerating agents appear in for instance DE-A-2616639, U.S. Pat. No. 4,797,275, JP-A-57049643 and JP-A57162610. In U.S. Pat. No. 3,891,592 a process is described for making polymers by oil-in-water emulsion polymerisation of an aliphatic diene, and polyalkylene glycol is included in the emulsion to cause agglomeration.

In many instances, for instance when the polymeric particles are wholly soluble in water, the initial dry particle size may be relatively unimportant since the particles are normally fully dissolved into water before use, for instance as a viscosifier or flocculant. However there are some instances where the particle size significantly influences performance. For instance when the particles are water swellable, water insoluble particles particular performance effects are achieved when the particles are very small, for instance below 10 µm. Because of the problems of dusting, it is not practicable to supply such polymer particles in the form of a powder having a substantial content of particles below 10 µm in size.

It is known to make extremely fine polymer particles (below 10 µm) in the form of a reverse phase dispersion of the particles in oil by reverse phase emulsion polymerisation. The particles in the initial dispersion contain water but if desired the dispersion can substantially be dehydrated, for instance by distillation of the water from the dispersion.

The resultant stable anhydrous or hydrous polymeric dispersions in oil can be used for various purposes. For instance if the particulate polymer has viscosifying properties then addition of the dispersion to an aqueous liquid will result in thickening of it.

The oil is necessary to deliver the particulate polymer but does not contribute to the performance of the polymer, and can introduce some undesirable effects. For instance print paste thickeners (the thickeners for textile printing pastes) can advantageously be made by reverse phase polymerisation. Conventionally the print paste is made by blending the reverse phase dispersion with water, pigment and various other additives that are selected to optimise the quality of the print. The oil of the initial dispersion necessarily remains in the print paste and may influence the properties of the paste.

Similarly, when other reverse phase dispersions are used, their use normally results in the introduction of the oil phase into the medium that is being treated by the polymer. Also the use of reverse phase dispersions necessitates that the user should be equipped with apparatus for storage and handling of the liquid products.

For this and other reasons it would be desirable to be able to eliminate the oil before use. Processes are known for precipitating polymer particles from a reverse phase dispersion and collecting them as a powder. The resultant powder has extremely fine particle size and so its manufacture and use potentially incurs the disadvantages associated with using and handling polymer fines.

It would be desirable to provide a novel way of formulating fine reverse phase polymer particles that allows efficient handling and utilisation of them and which avoids the problems associated with existing compositions and methods. In particular it would be desirable to provide a novel way of delivering fine reverse phase polymer particles in the form of a solid composition which avoids the dusting problems associated with polymer fines, both during manufacture and use, and yet which allows the particles to perform in use as individual particles having a very fine size, below 10 µm.

A product according to the invention contains water soluble or water swellable polymer particles and a wax, and in particular the product comprises a solid dispersion in a wax matrix which is solid at 20° C. and which melts below 250° C. of water soluble or water swellable polymer particles which have been made by reverse phase polymerisation and which have a size at least 90% by weight below 10 µm, wherein the dry weight ratio of polymer particles:wax matrix is less than 6:1.

Polymer particles made by reverse phase polymerisation will mainly have a substantially spherical shape, whereas particles made by other techniques followed by comminution will normally have a very angular shape.

Reverse phase polymerisation is conducted by emulsifying into organic liquid aqueous polymer droplets, usually in the presence of water-in-oil emulsifier and optionally a polymeric stabiliser, followed by polymerisation of the monomer to form an emulsion of aqueous polymer droplets dispersed in the organic liquid. The polymerisation may be by emulsion kinetics or by suspension kinetics but is conducted to provide particles having a sufficiently small particle size (below 10 m) that it can conveniently be regarded as an emulsion.

If desired, this emulsion of hydrous polymer particles in organic liquid can be subjected to distillation to evaporate water and provide what may be referred to as an anhydrous reverse phase dispersion of the fine polymer particles in the organic liquid.

It is possible to separate the polymer particles from the dispersion, for instance as agglomerates, and blend the collected particles with the wax matrix, for instance by blending the powder with particulate wax and then heating it to melt the wax or by blending the powder into the molten wax.

Preferably, however, the solid dispersion of polymer particles in wax matrix is made by forming a hydrous or, preferably, anhydrous reverse phase dispersion of the polymer particles in a volatile organic liquid in which the wax is mixed (as a solution or dispersion), and evaporating the organic liquid by distillation at a temperature above the melting point of the wax, and then cooling the product to solidify it. Usually the polymer particles are made by reverse phase emulsion polymerisation in volatile liquid in the absence of the wax to produce the polymer dispersion in volatile liquid, the wax is then mixed into the organic liquid, generally at a temperature which is above the melting point of the wax, and the organic liquid is then distilled from the dispersion. The polymerisation may be conducted in conventional manner using an initiator to induce polymerisation, a polymeric stabiliser and/or an emulsifier to promote the formation and stability of the initial dispersion and to produce the desired particle size of below 10 $\mu$m. If desired the polymerisation may be conducted in one organic liquid and this organic liquid may then be exchanged for another, volatile, organic liquid prior to dissolving the wax in it.

The polymer particle size in the initial reverse phase polymerisation product, and thus in the products of the invention, can be as low as 0.0 1$\mu$m but is generally at least 0.05 $\mu$m and often at least 0.1 $\mu$m. It is below 10 $\mu$m and usually it is below 3 $\mu$m, frequently below 2 $\mu$m. All particle sizes herein relate to the particle size of at least 90% by weight of the particles measured when dry.

The initial reverse phase polymer dispersion contains water in the polymer and some or all of the water may be distilled during the distillation of the organic liquid if it has not previously been removed by distillation. Accordingly, the polymer particles in the cooled solid product are usually substantially anhydrous, for instance containing below 10% water based on the weight of polymer.

The volatile liquid may be, for instance, an aliphatic or aromatic or cycloaliphatic hydrocarbon, an ether, an ester, or an alcohol, or a mixture of two or more of these, provided it is sufficiently volatile to be removable by distillation at the end of the process and is essentially immiscible with water. Examples are Exxsol D40 (trade mark), toluene, xylene, hexane, cyclohexane, diacetone alcohol, ethyl acetate, butyl acetate, and propylene glycol monomethyl ether.

The production of the products of the invention involves forming a mixture comprising a melt phase, which subsequently provides the wax matrix, and dispersed water soluble or water swellable polymer particles. The dry weight ratio of polymer particles to wax phase must not be too high as otherwise the dispersion of polymer particles in the molten wax will be such a stiff paste that it cannot conveniently be formed by mixing and then processed into the desired shape of the solid product. Generally the ratio must be less than 6:1 (around 86% polymer particles and 14% wax). The maximum ratio that is suitable for any particular blend will depend on the processing conditions, the nature and size of the polymer particles and the nature of the wax but it is usually not more than 5:1 (83% polymer 17% wax) and often below 4:1 (80% polymer 20% wax). For many products it is not more than 3:1 (75% polymer 25% wax).

From the point of view of manufacture, there is usually no critical lower limit on the ratio, and the product can be made using a significant excess of wax. This is acceptable or desirable when the wax is being provided to the user as a useful component in its own right (and not merely as a diluent or bonding agent). For instance, when it is desired to deliver a large amount (e.g., 10 parts) wax and a small amount (1 part) particulate polymer to a print paste or other system, the product can be formulated to consist of these proportions. However the ratio is usually not less than 1:2 (33% polymer 67% wax) and usually it is not less than 1:1 (50% polymer 50% wax).

The wax may be any substance or mixture that is solid at normal temperatures but is liquid at the temperature at which the volatile liquid is removed, and which is adequately compatible with the organic liquid. Usually the melting point of the wax should be above 30° C. and often above 40° C. It is usually undesirable to have to heat the mixture to too high a temperature and so preferably the melting point of the wax is not above 200° C., and most preferably it is not above 120° C. These are the melting points of the matrix, and so may be the melting point of the single material, when the matrix is formed of a single material, or may be the melting point of the molten blend that forms the matrix.

The wax is preferably selected such that it melts or dissolves or disperses readily under normal conditions of use of the solid product.

The wax having the defined melting point may be a single material or may be a blend of one or more materials that will provide the matrix. Any such blend may include material that does not form part of the melt phase when the total wax blend is molten, but the amount of non-meltable components is usually as low as possible since their inclusion will tend to reduce the amount of polymer particles that can be satisfactorily included in the product.

Components that are introduced with the wax and which do not go into the melt phase are excluded when considering the ratio of polymer particles:wax matrix and are usually present in very small amounts, usually less than 20% and usually below 5% by weight of the melt phase. Materials which appear to be in solution in the melt phase (in that it is not easily possible to determine a heterogeneous phase containing them) can be regarded as part of the wax matrix but again are usually present only in small amounts, below 20% and usually below 5% of the meltable components in the matrix. Usually the total amount of non-melting material is less than 20% and generally below 5% of the meltable material in the matrix.

Additives that may be included within the wax include additives to prevent agglomeration or reduce the melt viscosity or enable the wax to disperse in water. Examples are ethylene oxide-propylene oxide block copolymers e.g. Pluronic 3100, Pluronic 6200 (trade mark).

It may be desirable to include an oil-in-water emulsifier so as to promote the emulsification of the wax into dissolution water. However the osmotic pressure created by the polymer particles imbibing water may be sufficient to disrupt the matrix.

The wax matrix may consist of or comprise water soluble or water dispersible waxes. The amount of such waxes is preferably the predominant amount (above 50% by weight of the matrix) and is preferably above 80% by weight of the matrix. Examples include polyethylene glycols, for example, PEG 1450, PEG 4000, PEG 8000, polyethylene glycol esters, for example, PEG 8000 distearate, fatty acids, for example stearic acid or salts for example sodium or ammonium stearate, amides of fatty acids, for example, stearic acid diethanolamide, fatty alcohols, quaternary fatty waxes such as N-hydroxyethyl ethylene diamine reacted with stearic acid and then quaternised with dimethyl sulphate, or a mixture of two or more of these compounds.

Oil miscible low melting, waxy surfactants (e.g., the materials sold under the trade name "Dobanol") may be used as part or all of the wax matrix.

Instead of or in addition to using hydrophilic or other water soluble or water dispersable waxes, it is possible to use hydrophobic, water insoluble, waxes, such as paraffin waxes, polyethylene waxes and silicone waxes. If the matrix is formed of a hydrophobic wax, and if the solid product is to release its particles into an aqueous medium, it is generally necessary for the solid product to be in particulate or film form (typically having one dimension below 10 mm and often below 3 mm) so as to allow adequate migration of water through the wax into the polymer particles within the matrix. If it is desired to accelerate the rate of dissolution or disruption of the wax matrix, upon addition of the product of the invention to water, materials may be included which will increase the solubility or permeability of the matrix to water. If it is desired to decelerate the rate of dissolution or disruption of the matrix, materials may be included to reduce the hydrophilic nature of the matrix. For instance hydrophobic wax such as stearic acid may be blended into polyethylene glycol or other hydrophilic wax, so as to reduce the rate of solubility.

The water soluble polymer particles are generally formed from water soluble monoethylenically unsaturated monomer or monomer blend, and the water swellable polymer particles are generally made by cross-linking such a polymer, for instance by including a polyethylenically unsaturated cross-linking agent in the polymerisation mixture. Preferably the polymer is acrylic.

The monomers can be anionic or cationic or non-ionic. Blends can be amphoteric but are generally formed from anionic and non-ionic monomers or cationic and non-ionic monomers.

Suitable anionic monomers include (meth) acrylic acid (including alkali metal, ammonium or amine salts) and other ethylenically unsaturated carboxylic or sulphonic acid monomers. Suitable cationic monomers include dialkylaminoalkyl (meth)-acrylamide and—acrylate, generally as quaternary ammonium or acid addition salts, and diallyl dimethyl ammonium chloride. Suitable non-ionic monomers include acrylamide and N-vinyl formamide. The monomers and the polymerisation conditions will be chosen in conventional manner having regard to the desired end use of the product, for instance as a flocculant or as a viscosifier.

The invention is of particular value when the polymer particles are water swellable rather than water soluble, since the invention provides a convenient way of delivering into an aqueous system polymer particles having a size of below 10 $\mu$m and which retain, at least to some extent, their particulate nature when the product is mixed into water. Such particles may expand upon admixture to water but examination of their size conventionally involves examination of the particles after drying down as a coating (for instance by a scanning electron microscope) and all sizes herein refer to the dry particle size as determined by this method.

The solid product of the invention may take a wide variety of physical forms. For instance it may be particulate, with each particle being a dispersion of the polymer particles in the wax. Thus for instance the solid product may be granules of any convenient shape (including flakes and powder) having a maximum dimension typically below 30 mm or 20 mm and often below 10 or 5 mm. Generally the particle size is at least 0.05 mm (50 $\mu$m) and usually it is at least 0.1 mm. Preferred products of the invention comprise dispersion particles of which at least 90% by weight have a size in the range 100 to 1000 $\mu$m, often 150 to 500 $\mu$m.

Instead of providing the product in the form of dispersion particles, it can be provided as blocks, for instance tablets or larger blocks or as sheets. For instance a molten dispersion of the polymer particles in the molten wax matrix may be extruded or cast and cooled into the desired form of tablets, blocks or sheets.

The preferred particulate products of the invention may be made by comminuting a block or sheet of product made by casting or moulding, and cooling, the melt dispersion or by solidifying droplets or other shaped molten dispersion of polymer particles in wax. For instance the molten dispersion may be sprayed or otherwise distributed as droplets on a release coating on which is cools. In another technique, the melt dispersion is spray chilled to form relatively small particles or prills, which can be collected in conventional manner.

Instead of providing the solid product in the form of particles, it can be provided in the form of slabs or larger bodies, for instance having a minimum dimension of at least 20 mm and often 30 mm or 50 mm or more and having a maximum dimension of 50 mm, 100 mm or more. Blocks having a size of 10 mm or more can be made by casting or moulding the molten dispersion.

A particularly useful product according to the invention is a print paste thickener, in which event the polymer particles are usually water swellable polymer particles formed of a cross-linked monomer or monomer blend comprising acrylamide and/or acrylic acid (either as free acid or salt or a blend) and cross-linking agent. Generally the polymer is formed of 50 to 100% by weight acrylic acid and 0 to 50%, often 5 to 25%, by weight acrylamide. Preferably the product is supplied to the user as granules, flakes or other dispersion particles each comprising a dispersion of the polymer particles in wax, wherein the dispersion particles typically have all dimensions in the range 0.05 to 20 mm, often 0.1 to 1 mm or even up to 5 mm.

The print paste can be made by blending the granules or other dispersion particles with other components of the pastes. This eliminates the need for the textile printer to handle or evaporate the water-immiscible organic liquid in which the polymer particles were initially formed, and eliminates any risk of sedimentation of the polymer emulsion particles during transportation to the user. The user can merely be supplied with a bag of the granules.

Many textile print pastes do contain waxes for other purposes, for instance a wax such as polyethylene glycol distearate or other PEG ester is conventionally included in a print paste in order to improve the depth of colour. By selecting as the wax in the solid product of the invention a wax which has beneficial properties in the print paste, it is possible simultaneously to reduce the number of products that the textile printer has to handle and to eliminate the disadvantages of handling a reverse phase emulsion.

The invention is also of value for formulating other cross linked viscosifiers, or linear and water soluble viscosifiers, which previously have conveniently been supplied to the user as reverse phase emulsions (or substantially anhydrous dispersions) in oil. Such products include thickeners for enhanced oil recovery or other downhole uses, spray drift control additives for agricultural sprays, thickeners for polymer latices, and thickeners for personal care products, cosmetics and toiletries.

The invention can also usefully be applied to products which are to be used to promote sedimentation, thickening or dewatering of suspensions, for instance as bridging flocculants or as coagulants.

Preferred products of the invention are used as flocculants in which the polymer particles are formed of high molecular weight (for instance intrinsic viscosity above 4 dl/g) substantially water soluble polymers which are usually anionic or cationic. Intrinsic viscosity is determined by measurement with a suspended level viscometer at 20° C. in 1 Molar sodium chloride buffered to pH7.

Although the polymers may be wholly water soluble, if desired they can be cross-linked particles of size below 10

μm and often below 2 μm, and that contain soluble polymer so that the final polymer has the defined intrinsic viscosity. The polymer may give a specific viscosity of at least 10 and generally at least 100, all as described in EP 202,780. The polymers may be cationic and have an ionic regain of at least 15%, often at least 20% and preferably at least 25% as described in EP 202780. Preferably the polymer provides an intrinsic viscosity of at least 8 dl/g.

Thus, by the invention, it is possible to provide granules or other solid products containing very small lightly cross-linked polymer particles that can advantageously be used in high shear dewatering processes such as centrifugal dewatering, as described in EP 202,780.

Although flocculants can be mixed directly into the sewage, cellulosic, mineral or other suspension that is to be flocculated, it is generally desired to dissolve the dispersion particles, and thus the polymer particles, initially into water to form a dilute solution of polymer (typically have a polymer concentration of 0.01 to 3%) and then to add this dilute solution to the suspension or other medium that is to be treated.

Other useful flocculant solid products of the invention are blocks, including tablets or granules, that can be immersed in a flowing stream of an aqueous suspension and which are eroded by the flowing stream to release the polymer particles from the wax matrix with dissolution of the polymer. This can result in flocculation of particles in the flowing stream of suspension. Generally the blocks have a minimum dimension of at least 20 mm or 30 mm and may have a maximum dimension of, for instance, 100 to 500 mm. When the suspension that is to be flocculated is organic, the flocculant typically is formed by a blend of cationic and non-ionic monomers, and when the suspension is inorganic the flocculant is typically formed from a blend of anionic and non-ionic monomers.

Other products of the invention include agricultural soil conditioners, for instance where the polymer particles are of anionic soluble polymer of a type suitable for use as a soil conditioner.

The following are some examples;

EXAMPLE 1

172 g of 80% acrylic acid, 66 g of 50% acrylamide 0.4 g diethylene triamine penta-acetic acid, 1.1 g of methyl triallylamine methosulphate and 160 g water were stirred and cooled and 90 g of 32% ammonia was added slowly. 22.5 g of Span 85 (trade mark), 2.5 g Hypermerl599A (trade mark) 213 g toluene and 0.1 g AZDN were dissolved together. The monomer solution was emulsified into the solvent with a Silverson for 10 minutes with cooling. The resulting emulsion was sparged with nitrogen for 30 minutes and then treated with 0.1 g sodium metabisulphite in water and after 2 minutes a feed of 1% TBHP in Exxsol (trade mark) was started. The temperature rose by 74° C. over 10 minutes. The coagulum was filtered out to leave 300 g of a 28% emulsion of polymer in toluene. 9 g of 20% polymer of methacrylic acid with stearyl methacrylate in Exxsol D40 and 150 ml of toluene were added and the water was removed azeotropically under vacuum, with the temperature rising to 80° C. and the toluene being returned to the vessel. 96 g of PEG 1450 was added. The toluene was distilled off under vacuum at 80°–90° C. The remaining product was poured out of the vessel onto a cold flat surface where it set into a thin sheet which was broken up into flakes.

EXAMPLE 2

Standard printing stock. 40 g of Imperon Blue KRR (trade mark) and 120 g of Alcoprint PBA (trade mark) were stirred with 815 g of deionised water and 5 g of 0.880 ammonia was added. This stock was kept in a sealed bottle until required.

EXAMPLE 3

4.0 g of the flakes from Example 1 was stirred into 160 g of the stock from Example 2. The mixture was stirred slowly for 30 minutes. It then had a viscosity of 6800 cP (Brookfield RVT, 10 rpm, spindle 15, 25° C.). It was printed through a flat screen onto 50/50 cotton-polyester fabric. The result was a bright print with sharp outlines.

EXAMPLE 4

344 g of 80% acrylic acid, 131 g of 50% acrylamide. 0.9 g of diethylene triaminepentaacetic acid, 25 g of 1% aqueous methylene-bis-acrylamide were stirred with 345 g of water and cooled. 153 g of 32% ammonia was added slowly. 35 g of Span 80 (sorbitan mono oleate), 150 g of a 20% solution of a copolymer of methacrylic acid and stearyl methacrylate in Exxsol D40, 313 g of Exxsol D40 and 0.21 g of azoisobisbutyronitrile were stirred together until they formed a solution. The aqueous monomer was emulsified into the solvent solution using a Silverson for 10 minutes with cooling. This emulsion was deoxygenated by passing nitrogen through it for 30 minutes and then treated with 0.2 g of sodium metabisulphite dissolved in water and after two minutes a 1% solution of t-butyl hydroperoxide in Exxsol was added at ml/min. The temperature rose 73° C. in 7 minutes. The resultant lump-free emulsion was dewatered by azeotropic distillation under vacuum under a Dean and Stark tube to leave 900 g of a 43% dispersion of polymer in Exxsol D40.

EXAMPLE 5

50 g of the polymer dispersion from Example 4 was mixed with 21 g of the reaction product of stearic acid with N-hydroxyethyl ethylene diamine quaternised with dimethyl sulphate. The Exxsol was removed under vacuum at a temperature of 95° C. The remaining liquid was poured onto a cold flat surface, where it set as a thin sheet which was broken into small flakes. These flakes were ground to a fine powder having a size above 50 μm.

EXAMPLE 6

2.8 g of the powder from Example 5 was stirred into 140 g of the printing stock of Example 2 of 5 minutes. The viscosity was then 23000 cP (Brookfield RVT, spindle 6, 10 rpm, 25° C.). The paste was printed through a flat screen onto 50/50 polyester-cotton fabric. The resultant was a deep blue print with sharp outlines.

EXAMPLE 7

40 g of the polymer dispersion from Example 4 was mixed with 6.9 g of the reaction product of stearic acid and N-hydroxyethyl ethylene diamine and dimethyl sulphate and 10.4 g of polyethylene glycol 8000 distearate. The Exxsol was removed under at 95° C. The remaining liquid was poured onto a cold, flat surface, whereon it set as a thin sheet which was then broken into small flakes. These flakes were ground into a fine powder having a size above 50 μm.

EXAMPLE 8

30.0 g of the powder from Example 7 was stirred into 150 g of the printing stock of Example 2 for 5 minutes. The viscosity was 21000 cP (Brookfield RVT, spindle #6, 10 rpm, 25° C.). The paste was printed through a flat screen onto 50/50 polyester-cotton fabric. The result was a deep blue print with sharp outlines.

As an example of a sewage flocculation process, it is possible to make a copolymer of, for instance, about 50% acrylamide and 50% dimethylaminoethyl acrylate quaternised with methyl chloride and about 20 ppm methylene bis acrylamide by reverse phase polymerisation followed by dehydration substantially as described in EP 202,780, and polyethylene glycol may then be mixed into the oil. The oil evaporated and the product cooled and converted to particles having a size 50 to 1000 μm, as described in the preceding examples. The resultant dispersion particles may be stirred with water to form an aqueous solution of the cationic polymer (containing both fully dissolved polymer and suspended polymer particles having a size below 10 μm) and this solution may then be used as a flocculant solution in conventional manner in a centrifugal, belt press or other high shear dewatering process.

We claim:

1. A solid product in the form of dispersion particles having a size of at least 90% by weight above 50 μm and below 5 mm wherein each dispersion particle comprises a solid dispersion in a water-soluble or water-dispersible wax matrix which is solid at 20° C. and which melts below 250° C. of substantially spherical water-soluble or water-swellable polymer particles which have been made by reverse-phase polymerization of a water-soluble ethylenically unsaturated monomer or monomer blend and which have a size of at least 90% by weight below 10 μm, wherein the dry weight ratio of polymer particles:wax matrix is from at least 1:2 to less than 6:1.

2. A product according to claim 1 in which the said dry weight ratio is 1:1.

3. A product according to claim 1 in which the wax matrix has a melting point: of 40° to 200° C.

4. A product according to claim 1 in which the wax matrix predominantly comprises polyethylene glycol or polyethylene glycol ester.

5. A product according to claim 1 in which the polymer particles are cross linked, water swellable, polymer particles.

6. A product according to claim 5 and which is a print paste thickener.

7. A product according to claim 6 in which the polymer particles are formed from acrylic acid (or water soluble salt thereof) or a blend of acrylic acid with acrylamide.

8. A product according to claim 1 in which the polymer is a substantially water soluble polymer which is a viscosifier or thickener.

9. A product according to claim 5 in which the polymer particles comprise water swellable cross linked polymer particles and provide an intrinsic viscosity of at least 4 dl/g.

10. A product according to claim 9 in which the polymer particles are cationic and provide an ionic regain value of at least 20%.

11. A method of making a solid product in the form of dispersion particles having a size of at least 90% by weight above 50 μm and below 5 mm wherein each dispersion particle comprises a solid dispersion in a water-soluble or water-dispersible wax matrix which is solid at 20° C. and which melts below 250° C. of substantially spherical water-soluble or water-swellable polymer particles which have a size of at least 90% by weight below 10 μm, wherein the dry weight ratio of polymer particles:wax matrix is from at least 1:2 to less than 6:1, comprising forming the polymer particles by reverse-phase polymerization of a water-soluble ethylenically unsaturated monomer or monomer blend as an emulsion of the polymer particles in a volatile organic liquid, mixing the wax into the liquid, distilling off the volatile liquid at a temperature at which the wax is molten to form a molten dispersion of the polymer particles in the molten wax, and forming the dispersion particles having a size of at least 90% by weight above 50 μm and below 5 mm either by cooling and solidifying the melt and comminuting the solidified product or by cooling and solidifying droplets of the melt.

12. A product according to claim 1 and which is a flocculent or a coagulant.

* * * * *